United States Patent
Lee

(10) Patent No.: US 10,268,335 B2
(45) Date of Patent: Apr. 23, 2019

(54) CUSTOM ONBOARDING PROCESS FOR APPLICATION FUNCTIONALITY

(71) Applicant: Flipboard, Inc., Palo Alto, CA (US)

(72) Inventor: Douglas Tchun Jia Lee, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 314 days.

(21) Appl. No.: 15/280,773

(22) Filed: Sep. 29, 2016

(65) Prior Publication Data

US 2018/0088742 A1    Mar. 29, 2018

(51) Int. Cl.
| | |
|---|---|
| *G06F 3/048* | (2013.01) |
| *G06F 3/0481* | (2013.01) |
| *H04L 29/08* | (2006.01) |
| *G06F 3/0483* | (2013.01) |
| *G06F 17/24* | (2006.01) |
| *G06F 3/0482* | (2013.01) |

(52) U.S. Cl.
CPC .......... *G06F 3/0481* (2013.01); *H04L 67/306* (2013.01); *G06F 3/0482* (2013.01); *G06F 3/0483* (2013.01); *G06F 17/248* (2013.01)

(58) Field of Classification Search
CPC ...................................................... G06F 3/048
See application file for complete search history.

(56) References Cited

U.S. PATENT DOCUMENTS

2005/0054381 A1* 3/2005 Lee .................. G06F 3/011
                                                                    455/557
2006/0167837 A1* 7/2006 Ramaswamy ........ G06F 3/0481

\* cited by examiner

*Primary Examiner* — Pei Yong Weng
(74) *Attorney, Agent, or Firm* — Fenwick & West LLP

(57) ABSTRACT

A user is presented with a digital magazine through a user interface of his/her client device. By monitoring the user's interactions with the digital magazine or content of the digital magazine, action with the user interface can be used to progress the user to discovery of and access to similarly grouped functionality, e.g., a reader category, a communicator category, and a curator category. For example, each category of user interactions can represent a different set of functions of the digital magazine. Based on the user interactions, a skill level of the user in each of the categories can be determined. One or more functions of the digital magazine can then be selected for presentation to the user based on the user's skill level in each category. The user interface of the digital magazine can then be modified to include the additional functions of the digital magazine, and the digital magazine can be presented to the user.

20 Claims, 12 Drawing Sheets

CUSTOM ONBOARDING PROCESS FOR APPLICATION FUNCTIONALITY

BACKGROUND

The disclosure generally relates to providing digital content to users of a digital magazine server, and more specifically to a customizable user interface for progressively presenting functions of computer applications to a target user based on the target user's functionality skills with the functions of the computer applications.

Digital distribution channels disseminate a wide variety of digital content including text, images, audio, links, videos, and interactive media (e.g., games, collaborative content) to users. The increasingly popular computing devices, such as smart phones, tablet computers, and increased network bandwidth (for wired and wireless networks) have provided more communications platforms for users to search and consume digital content. However, a user of a computer application, e.g., a mobile digital magazine, can be overwhelmed by a user interface offering full access to all features or functionality of the digital magazine by a digital magazine server, especially when the user first interacts with the application. Existing techniques for presenting functionality of computer applications, e.g., functionality of a digital magazine application to access digital content, to users do not into account progress of how the user interacts with the digital content through progressive usage of the functionality of computer applications, thus discouraging users from fully enjoying the digital content.

SUMMARY

According to some implementations, a user is presented with a digital magazine through a user interface of his/her client device. For example, through a digital magazine application executed on the client device of a user. The user's interactions with the digital magazine or content items of the digital magazine through the user interface can be monitored, for example, by the client device. The interactions are categorized and ordered into a progression for the monitored user to follow. Based on the user's interactions, a skill level of the user in each of the categories can be determined. For example, the skill level of the user for a category, e.g., a reader category, can be determined based on the user interactions in that category. As the user progresses, one or more functions of the digital magazine can then be presented to the user, for example based on the user's skill level in a category, such as functions of the digital magazine providing access to additional functionality in that category of functions of the digital magazine. The user interface of the digital magazine on the client device can then be modified to include interface elements to allow the user to access the additional functions of the digital magazine.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Environment Overview

A digital magazine is a personalized, customizable application for displaying content items from a various sources to a user of a client device (e.g., a mobile communication device, tablet, computer, and any other suitable computing system). In some embodiments, a user interface of a digital magazine generated for a user is modified based on the user's usage of or experience with functionalities of the digital magazine. For example, a user interface can be modified based on a specific user's level of experience interacting with the digital magazine being executed on a client device operated by the user. A user profile can be built based on the user's functionality skills with a digital magazine and a group of content items are selected based on the user profile and presented to the user as a personalized digital magazine. A "digital magazine" herein refers to an aggregation of digital content items that can be presented to users in a presentable format similar to the format used by print magazines. A "content item" or "article" herein refers to any machine-readable and machine-storable work product, such as textual articles, pictures/images, videos, user-generated content (e.g., content posted on a social networking system), advertisements, and any other types of digital content capable of display within the context of a digital magazine. In one embodiment, a digital magazine assembles a list of universal resource locators (URLs), where each article of the digital magazine is based on the content of a resource on the Internet to which a URL of the list of the URLs references to.

Figure 1:
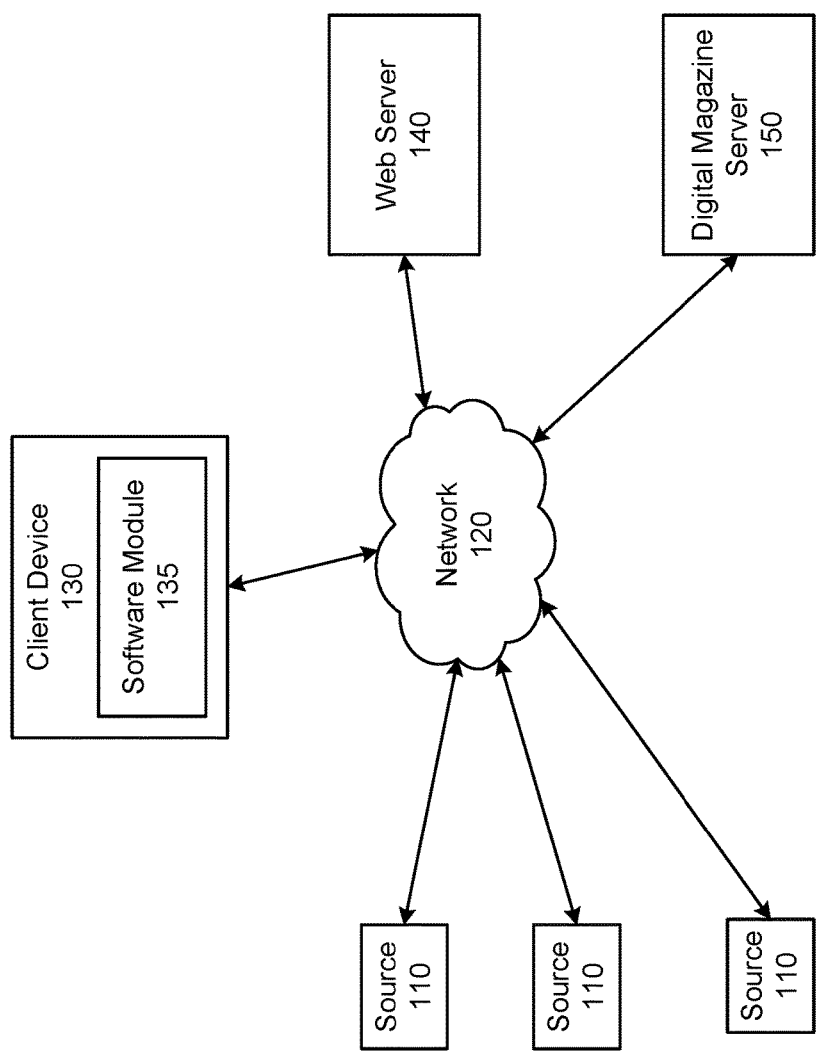
FIG. 1 is a block diagram of a system environment in which a digital magazine server operates, according to one embodiment.

FIG. 1 is a block diagram of a system environment 100 in which a digital magazine server 150 operates, according to one embodiment. The system environment 100 shown by FIG. 1 includes one or more sources 110, a network 120, one client device 130 with an embedded software module 135, a web server 140 and a digital magazine server 150. To simplify the description of FIG. 1 only three sources 110, one client device 130, one web server 140 and one digital magazine server 150 are shown. However, embodiments of the system environment 100 can have many resources 110, client devices 130, web servers 140 and digital magazine servers 150 connected to the network 120. Likewise, the functions performed by the various entities of FIG. 1 may differ in different embodiments. The embodiments described herein can be adapted to online systems that are not digital magazine severs 150.

A source 110 is a computing system capable of providing various types of digital content to the client device 130 and the digital magazine server 150. Examples of content provided by a source 110 include text, images, video, or audio on web pages, web feeds, social networking information, messages, or other suitable digital data. Additional examples of content include user-generated content such as blogs, tweets, shared images, videos or audios, social networking posts, and social networking status updates. Content provided by a source 110 may be received from a publisher and distributed by the source 110; alternatively, a source 110 may be a publisher of content it generates. For convenience, content from a source 110, regardless of its composition, is referred to herein as an "article," a "content item," or as "content."

A content item may include various types of content elements such as text, images, video, interactive media, links, and a combination thereof. The sources 110 communicate with the client device 130 and the digital magazine server 150 via the network 120. The network 120 may comprise any combination of local area and/or wide area networks, using both wired and/or wireless communication systems.

In one embodiment, the network 120 uses standard communications technologies and/or protocols. For example, the network 120 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is a computing device capable of receiving user input as well as transmitting and/or receiving digital data via the network 120. Various embodiments of the client device 130 include a conventional computer system, such as a desktop or a laptop computer, and a device having computer functionality, such as a personal digital assistant (PDA), mobile telephone, smartphone, or any other suitable device. The client device 130 can comprise a software module 135 which can allow a user to interact with the digital magazine server 150. For example, the software module 135 executing on the client device 130 communicates instructions or requests for content items to the digital magazine server 150. In some embodiments, the client device 130 executes a browser that receives pages from the digital magazine server 150 and presents the pages to a user of the client device 130. In another embodiment, the client device 130 interacts with the digital magazine server 150 through an application programming interface (API) running on a native operating system of the client device 130, such as IOS® or ANDROID™.

Different client devices 130 can have different characteristics such as different processing capabilities, different connection speeds with the digital magazine server 150 over the network 120, and different device types (e.g., make, manufacture, version). For example, in one embodiment, a client device 130 includes a display device (not shown) and an input device (not shown). A display device included in the client device 130 presents content items to a user of the client device 130. An input device included in the client device 130 receives input from a user of the client device 130. The user input is processed by a digital magazine application executing on the client device 130 to allow the user to interact with content items presented by the digital magazine server 150.

In some implementations, the user can interact with content of a digital magazine provided by the digital magazine server 150 through a user interface (UI) provided by the software module 135. For example, a software module 135 can be a client-side application executed on the client device 130 and the software module 135 is configured to provide a user interface of a digital magazine to the user and monitor the user's interactions with the digital magazine through the user's actions on one or more user interface (UI) elements of the user interface. Each interaction indicates some progress of the user's functional skills with the digital magazine. Each user interface element (UI element) can allow the user to access distinct functions of the digital magazine by interacting with the UI element. For example, some implementations include a "like" UI element allowing users to "like" a specific content item; an interaction with "like" indicates user's some level of communication skill. Initially, the software module 135 provides a user interface of a digital magazine with a default minimum number of UI elements, e.g., just one element for the user to flip pages of the digital magazine. With the user's increased interactions with the digital magazine, which presents increased functional skills of the user with the digital magazine, the software module 135 updates the user interface of the digital magazine, e.g., adding more UI elements such that the user can interact with the digital magazine in a more advanced and complex way, such as adding comments on a thread of comments presented to the user.

In some embodiments, each user of a digital magazine is associated with a user interface distinct to that user (hereinafter a "user-specific UI"), for example based on past user actions, user selection, or any other suitable features derived from that user's interactions with the digital magazine. Each user-specific UI can contain a distinct set of UI elements in an arrangement specific to the associated user. According to some implementations, the set of UI elements of a user-specific UI can be based in part on data indicating the progression or characteristics of the specific user's interactions with the digital magazine (hereinafter "user progression data"). For example, user progression data can indicate what functions of the digital magazine is available to the specific user. Functions of the digital magazine to be presented to a user can be described in connection with how the user consume or otherwise interact with content items of the digital magazine, e.g., viewing or reading a content item, or liking, sharing, or commenting on a content item. Similarly, user progression data can indicate relative levels of usage of the functions of the digital magazine by the specific user.

In some embodiments, user progression is described by a user progression tree, e.g., having a hierarchical tree structure of steps or nodes, each representing the user's skill level with distinct functions of the digital magazine. A user's progress can be shown through the user progression tree from one or more root nodes to the next level leaf nodes based on user interaction with the digital magazine. In some embodiments, additional functions of the digital magazine are unlocked based on user progression with the digital magazine. For example, each unlocked step of a user progression tree can represent a function which is "unlocked" or made available to the user based on the step being unlocked. A user progression tree can be split into multiple subtrees each having a hierarchical tree structure. Each separate subtree can be associated with a category of functions of the digital magazine, e.g., a reading skill subtree, curation skill subtree and communication skill subtree. In some implementations, changes are made to a user's associated user-specific UI responsive to the user's progress of functional skills with the digital magazine, for example with new functions of the digital magazine being unlocked. Although the software module 135 is illustrated herein with respect to a digital magazine application, other embodiments of the software module 135 can be implemented as a part of the digital magazine application and/or with respect to other executable applications running on the client device 130.

The web server 140 is a computer system that process requests based on network protocols, e.g., HTTP. In one embodiment, the web server 140 links the digital magazine server 150 via the network 120 to the one or more client devices 130, as well as to the one or more sources 110. The web server 140 serves web pages as well as other digital content to the digital magazine server 150 and communicates instructions to a client device 130 for generating pages of content items in a suitable presentation style/format for presentation to a user of the client device 130. In the embodiment shown in FIG. 1, the web server 140 is a network entity separate from the digital magazine server 150. In other embodiments, the web server 140 is a component of the digital magazine server 150. The digital magazine server 150 can determine a user archetype for a user and predicts likely topics or content items of interest based on the determined archetype and other factors such as data about user progression or data about an associated user-specific UI. The digital magazine server 150 then selects and presents content items on the likely topics of interest to the user in a digital magazine format, for example through a client device 130. Each selected content item is related to a predicted topic of interest and is then presented to the user in a digital magazine format. For example the digital magazine server 150 can determine that a user is associated with a "communicator" archetype indicating that the user often communicates with other users. Correspondingly, the digital magazine server 150 can recommend content items with large numbers of comments to the user. One embodiment of the digital magazine server 150 is further described with reference to FIG. 2 below.

Example Digital Magazine Server

Figure 2:
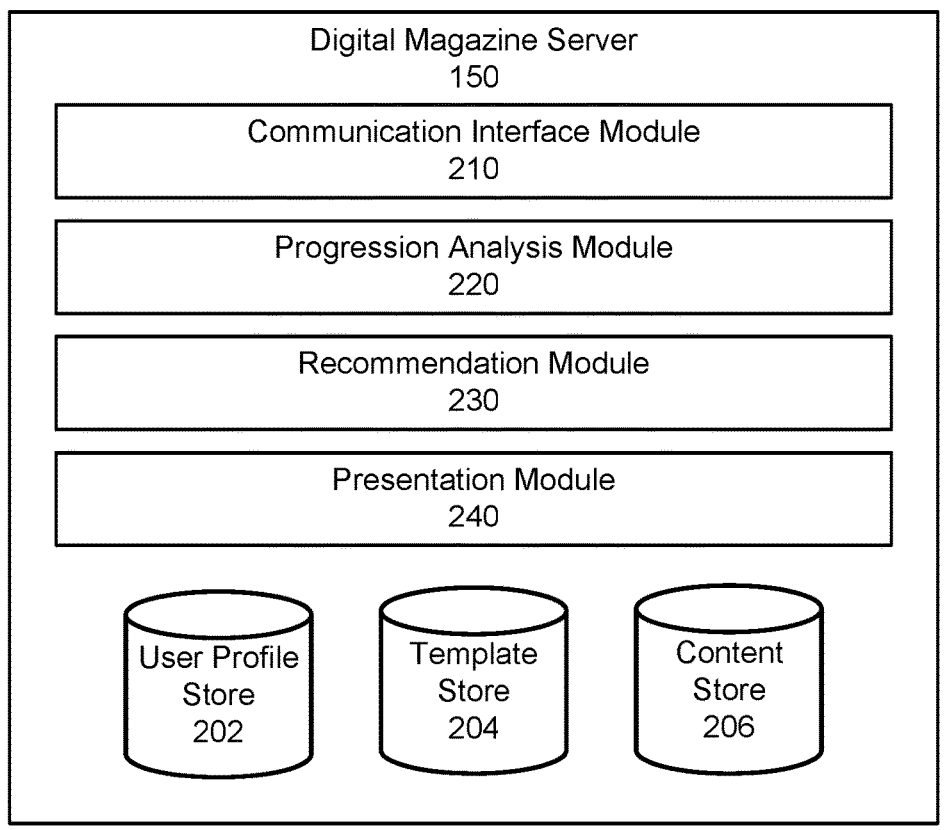
FIG. 2 is a block diagram of an example digital magazine server according to one embodiment.

FIG. 2 is a block diagram of an example digital magazine server 150 according to one embodiment. In the embodiment of FIG. 2, the digital magazine server 150 includes a user profile store 202, template store 204, content store 206, communication interface module 210, progression analysis module 220, recommendation module 230, and presentation module 240. In other embodiments, the digital magazine server 150 may include additional, fewer, or different entities for various applications, for instance, the features of a single module may be split into several modules, or one module might combine functions of several modules.

The user profile store 202 stores user profiles of users of the digital magazine server 150. Information stored in a user profile can include biographic, demographic (e.g., age, gender, occupation, education, socioeconomic status), and other types of information, such as gender, hobbies or preferences, location (e.g., residence, birthplace, check-in locations), or any other suitable information. The user profile store 202 can also include information for accessing one or more online networking systems or other types of sources (e.g., a user name, a password, an access code) that a user has authorized the digital magazine server 150 to access. In some configurations, user profiles within user profile store 202 additionally store user progression data such as information about users' levels of skills with functions of the digital magazines; each user profile may further store data about a user-specific UI of a digital magazine associated with the user, such as the layout of the user-specific UI of the digital magazine when presenting the digital magazine to the user. User progression data or user-specific UI data can be accessed for analysis by other parts of the digital magazine server 150 for better serving the user, e.g., providing more targeted content items to the user based on the user's levels of skills with the digital magazine.

The template store 204 stores page templates each describing a spatial arrangement ("layout") of content items relative to each other on a page for presentation by a client device 130. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110.

The content store 206 stores objects that represent various types of digital content. In one embodiment, the objects are URLs, each of which references to a resource on the Internet. For example, the content store 206 stores content items received from one or more sources 110 (e.g., the resources referenced to by the URLs) within a threshold time of a current time, e.g., 6 months. Examples of content items stored by the content store 206 include page posts, status updates, photographs, videos, links, news articles, audios, check-in events at locations, or any other types of content. In some embodiments, each content object stored within content store 206 is associated with one or more topics.

The communication interface module 210 controls and facilitates interactions between client devices 130 and the digital magazine server 150 over the network 120. The communication interface module 210 can receive and process requests or queries from client devices 130.

In the embodiment of FIG. 2, the progression analysis module 220 uses data gathered from the user profile store 202, to analyze user progression data. In some implementations, the progression analysis module 220 can detect one or more user archetypes associated with a user. A user archetype is a category or type of user and can be associated with the user's functional skills based on user's interactions with or skills with functions of the digital magazine. For example, a "communicator" archetype can be associated with a user's functional skills based on the user's certain types of interactions with content items of a digital magazine, e.g., commenting on content items, replying to comments, asking questions about content items and the like, while a "reader" archetype can be associated with a user's functional skills based on the user's certain types of interactions with content items of a digital magazine, e.g., viewing content items, viewing suggested content items and similar. In some embodiments, a user archetype is indicative of a user's preferred methods of interaction with the digital magazine.

In some embodiments, the progression analysis module 220 analyzes and the user progression tree data to determine one or more archetypes for a user. In some implementations, unlocked functionalities described by a progression tree associated with the user can be analyzed to determine which functionalities associated with a user archetype have been unlocked by the user, for example determining whether "commenting" and "sharing" functionalities associated with a "communicator" archetype have been unlocked for the user. Based on the determined the archetype of the user, a user-specific UI can be determined for the user, including identifying which UI elements associated with the determined user archetype are present in the user-specific UI, such as UI elements to implement "commenting" and "sharing" functionalities of the digital magazine. Similarly, the position of UI elements within the user-specific UI can be determined such that the UI elements are positioned according to their importance to the user. For example, a relative hierarchy of elements within the UI can be determined based on position within the user-specific UI, with elements in more prominent or easily accessible positions within the UI appearing higher in the hierarchy.

In one embodiment, a user's association with an archetype can be determined by calculating a score for each archetype comprising the weighted aggregate of the user interactions with content items of a digital magazine presented to the user. Each user interaction is categorized to an archetype based on its connection with the archetype, and each interaction can be assigned a weight, e.g., 2 points. For example, a user interaction such as subscribing to a topic, marking a content item as "read later," viewing content items, and viewing content tags is categorized to "reader" archetype; a user interaction such as liking an article, commenting on an article, liking a comment, replying to a comment, answering a question, and asking a question is categorized to "communicator" archetype; a user interaction such as adding an article to a digital magazine, captioning an article, and promoting a content item to a cover is categorized to "curator" archetype. In another implementation, a user can be assigned a level of association with each individual archetype based on the score for that archetype. For example, a user can be a "level 1" in the "reader" archetype and a "level 3" in the communicator archetype.

Recommendation module 230 identifies likely content items of interest to a user based on a user profile derived from corresponding user progression data. The recommendation module 230 can then search through the content store 206 to find appropriate content items based on the user profile, or any other suitable factors. For example, content items may be selected based on topic, date of creation, source, media format, associated user archetype, or any other suitable feature. In some embodiments, content items are ranked based on a plurality of weighted factors indicating the relevance of the content item to the user. For example, content items associated with many comments can be weighted higher for users associated with the "communicator" archetype. Similarly, content items on a topic subscribed by the user are selected for a user associated with the "reader" archetype.

Presentation module 240 presents the selected content items to the user of the digital magazine server 150. The presentation module 240 stores instructions for presenting content items generated by the digital server 150 on a client device 130 of a user, and facilitates the presentation of content items on the client device 130. In one embodiment, the presentation module 240 receives a selection of one or more content items recommended by the recommendation module 230, generates a personalized digital magazine from the selected content items, and presents the personalized digital magazine to the client device 130 of the user for display. In one embodiment, to generate a personalized digital magazine, the presentation module 240 retrieves the selected articles of the digital magazine from the content store 206, selects a page template from the template store 204 based on the user profile, e.g., type of display of the client device 130 associated with the user, and generates instructions on how to present the generated digital magazine on the client device 130 of the user.

Example Software Module

Figure 3:
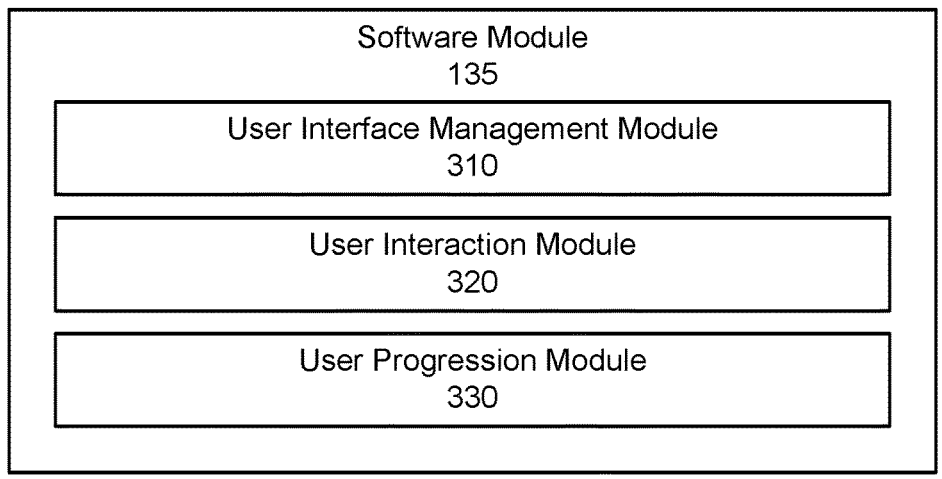
FIG. 3 is a block diagram of an example software module operating on a client device, according to one embodiment.

FIG. 3 is a block diagram of an example software module 135 operating on a client device 130, according to one embodiment. As noted previously, the software module 135 can allow users to interact with content of the digital magazine server 150 via a digital magazine application executing on the client device 130. In the embodiment of FIG. 3, the software module 135 comprises a user interface management module 310, a user interaction module 320, and a user progression module 330. In other embodiments, the software module 135 may include additional, fewer, or different entities for various applications, for instance the features of a single module may be split into several modules, or one module might perform the functions of several modules.

In some embodiments, the user interface management module 310 generates a customized UI to present a digital magazine to a user based on the user's skill levels with various features/functions of the digital magazine. For example, the user interface management module 310 allows the user to define where to place UI elements with the user-specific UI such that the user can interact with the digital magazine in a preferred way. The available UI elements can be based on user progression data of the user. For example, user progression data can comprise data about the user's skill levels with features, functions, or functionality of the digital magazine available to the user. In some embodiments, these features are each linked to one or more UI elements and the associated UI elements can be added to the user-specific UI based on the user's corresponding skill levels. The user-specific UI can include elements suitable for a user according to the user's archetype, for example, UI elements such as "like," "comment," and "answer question" for a user of "communicator" archetype. Similarly, certain UI elements may not be available to a user based on user progression data, for example advanced version of functions for which a user has not demonstrated proficiency with the basic versions. In some embodiments, UI elements can be added to the user-specific UI based on user progression data indicating the user has shown a skill level regarding the associated functions. For example, a user new to interacting with digital magazine can be associated with a simplified user-specific UI so the user can learn and become proficient with the basic functions before being introduced to the more advanced functions of the digital magazine.

The user interaction module 320 can allow a user to interact with content of the digital magazine presented to the user and monitor the user interactions with the content items of the digital magazine. In some embodiments, the user interaction module 320 displays the digital magazine to the user with an associated user-specific UI and allows the user to interact with the functions of the digital magazine through the user-specific UI. As mentioned above, the software module 135 can utilize a display device and an input device of the client device 130 to display the user-specific UI to the user.

In some embodiments, the user progression module 330 controls which functions of the digital magazine are available to each user of the digital magazine system, for example based on a progression tree associated with the user, where the progress tree representing the user's functional skills with the digital magazine. In some embodiments, the user progression module 330 determines a level of progression of a user based on the user's interaction with the content items of the digital magazine through the user-specific UI. For example, new functions of the digital magazine can be unlocked based on a score generated by weighting the user's interactions with the digital magazine reaching a threshold level. In some implementations, each type of user interaction with the digital magazine is assigned a point value; for example, viewing a content item can be assigned a point value of 3, whereas leaving a comment on a content item can be assigned a point value of 6. Similarly, the user can be assigned a total interaction value comprising an aggregate of the point values of all the actions taken by the user. In this example, when the interaction value of a user reaches a threshold level, additional functions of the digital magazine are unlocked. For example, a brand new user can be assigned an interaction value of 0, while a more experienced user who has viewed 30 content items and commented on 10 can be assigned an interaction value of 150, and therefore can access and unlock additional functions of the digital magazine. For example, additional functions can be unlocked based on reaching thresholds of 50, 100, and 150. As described above, additional functions being unlocked for a user can result in corresponding changes to the user-specific UI associated with that user to enable the user to utilize the unlocked functions.

In some embodiments, each type of user interaction is additionally associated with a function category and each category can be associated with a category-specific threshold. In some implementations, functions associated with a function category are unlocked based on progress towards the category-specific threshold in that category. Interactions associated with the category can contribute towards the category-specific threshold. In some embodiments, multiple additional functionalities are associated with each threshold level of a category.

According to some implementations, user progression or skill level with a function of digital magazine is determined based on user interactions with content items of the digital magazine, and the user progression can be represented by a user progression tree. In some configurations, each node of the user progression tree is associated with a threshold specific to a function. Each threshold can be a general threshold, a category-specific threshold, or an individual threshold towards which only specific interactions can contribute. For example, to unlock a function represented by a node of the user progression tree, only interactions unlocked by a preceding node of the user progression tree contribute towards the threshold for that node, according to some implementations. In other embodiments, the user may select from a plurality of functionalities to unlock when a general or category-specific threshold is reached. User progression tree will be discussed further below.

Example User Interfaces

Figure 4A:
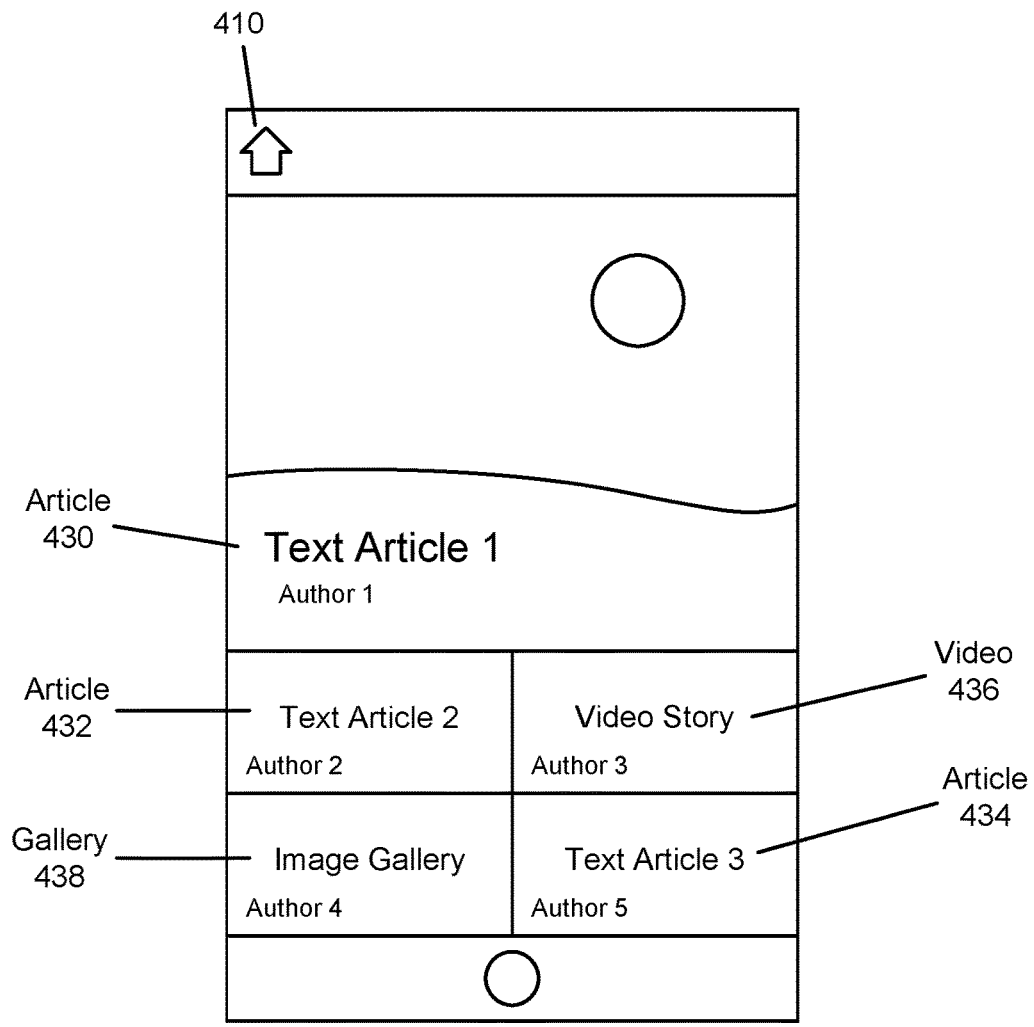
FIG. 4A illustrates an example user interface for displaying a default set of functions of a digital magazine to a user of a client device, according to one embodiment.

FIG. 4A illustrates an example basic user interface of a digital magazine presented to a user of a client device 130, according to one embodiment. The user interface 400 includes a UI element 410, as well as UI elements corresponding to content items of the digital magazine accessible through the user interface 400, for example, articles 430, 432, and 434, video 436, and gallery 438. In the embodiment of FIG. 4A, the user interface 400 is a user specific UI associated with a user of the digital magazine. In some implementations, the user interface 400 can represent a user interface associated with a user new to the digital magazine system; therefore the user interface 400 includes UI elements for only a subset of the functions of the digital magazine. For example, the UI elements 430-438 can be interacted with to access content items of the digital magazine and the UI element 410 allows a user to return to a "home" or "main" screen of the user interface when interacted with. When displayed to a new user of the digital magazine, the user interface 400 can allow the user to become familiar with the basic functions of the digital magazine, for example the functions represented by UI elements 410 and 430-438, before gaining access to more advanced functions. In this example, the basic functions allow a user to view various content items presented within the user-specific UI and to return to a main screen of the user-specific UI.

Figure 4B:
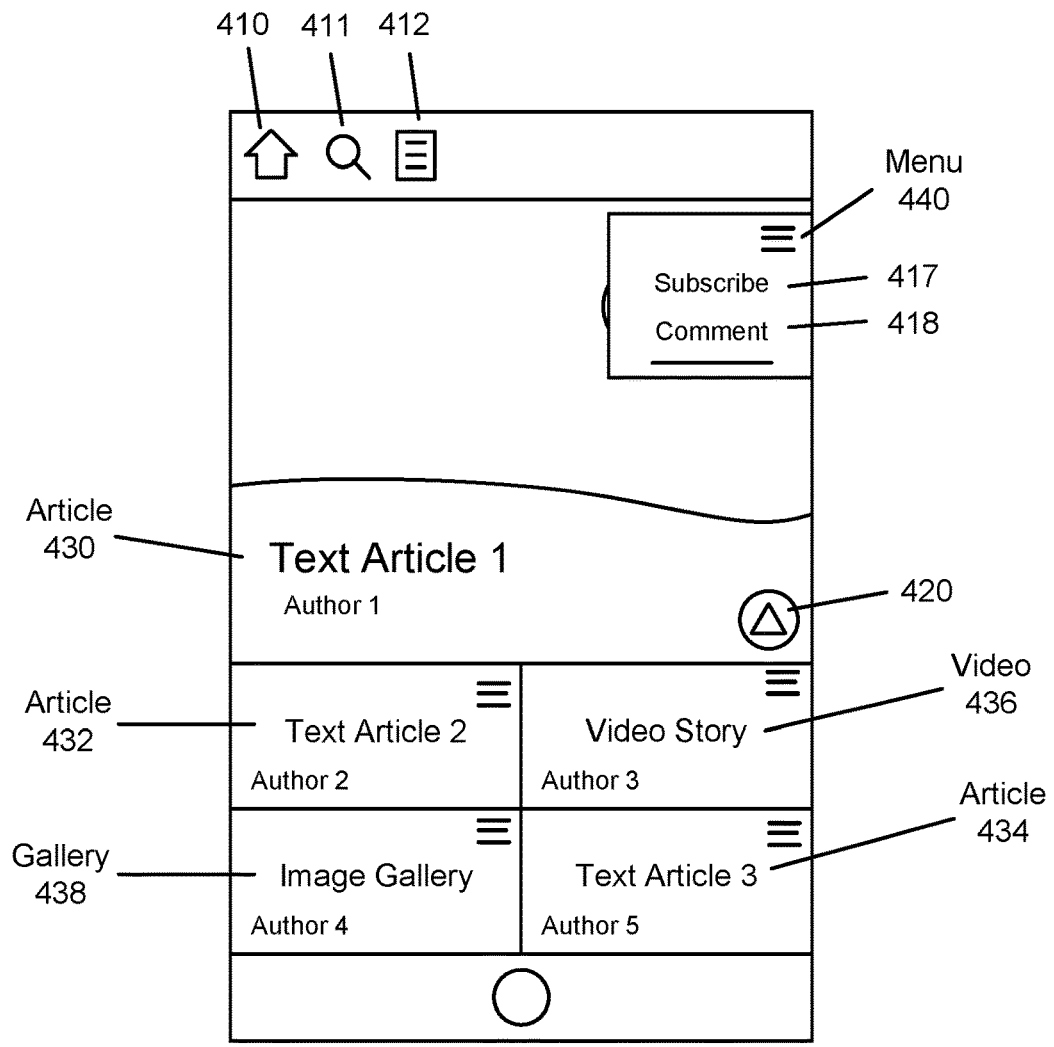
FIG. 4B illustrates an example customized user interface for presenting additional functions of a digital magazine to a user of a client device, according to one embodiment.

FIG. 4B illustrates an example customized user interface of a digital magazine presented to a user of a client device 130, according to one embodiment. Similar to the user interface 400, the user interface 401 includes a UI element 410 and UI elements corresponding to content items of the digital magazine system accessible through the user interface, for example, articles 430, 432, and 434, video 436, and gallery 438. However, the user interface 401 additionally includes UI elements 411, 412, and 420 and a menu 440 including menu elements 417 and 418. Each additional UI element added in the user interface 401 can access additional functions not available to a user associated with the user interface 400 of FIG. 4A. For example, the UI element 420 can allow a user to "like" a content item and menu items 417 and 418 can respectively allow a user to subscribe to a content author and comment on a content item.

In some embodiments, each of the additional UI elements is associated with a category of actions. For example, the "subscribe" menu element 417 can be associated with a "reading" category and may have been unlocked based on other user interactions in that "reading category," such as reading articles within the digital magazine system. For example, the user interface 401 can be user-specific UI associated with a user who has access to unlocked additional functions of the digital magazine, where the UI 401 corresponds to a higher skill level of the user than the UI 400 does.

As mentioned above, in some embodiments a user is able to control the positioning of the UI elements within his/her associated user-specific user interface, for example the user interface 401. According to some embodiments, the user can control the order and position of the menu items within the menu 440. Similarly, the user can request to remove unused menu items from the user interface 401, for example removing the "subscribe" menu item 417.

Figure 4C:
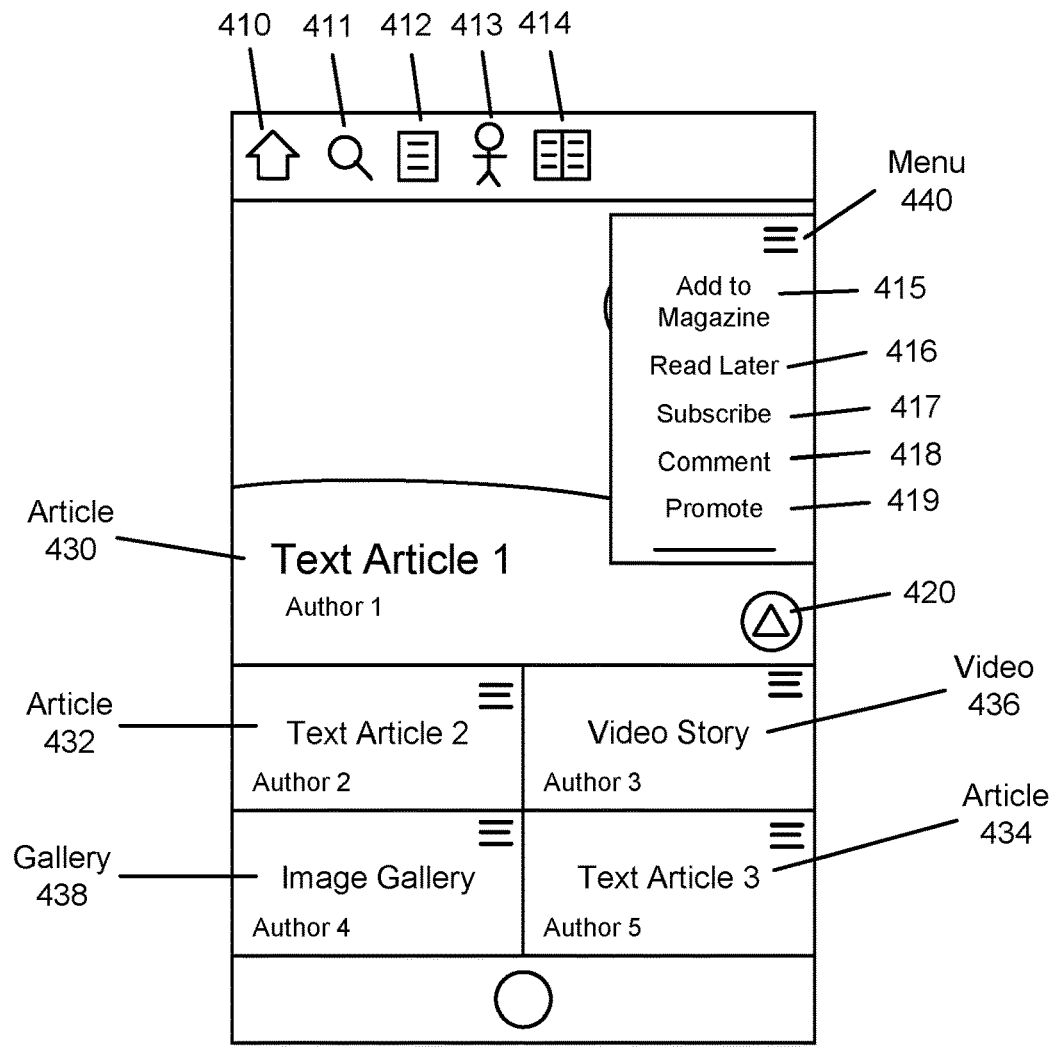
FIG. 4C illustrates an additional example of a further customized user interface of a digital magazine in accordance with a user's skills with the functions of the digital magazine, according to one embodiment.

FIG. 4C illustrates an additional example customized user interface of a digital magazine presented to a user of a client device 130, according to one embodiment. Similar to the user interfaces 400 and 401, the user interface 402 includes a UI element 410 and UI elements corresponding to content items of the digital magazine system accessible through the user interface, for example, articles 430, 432, and 434, video 436, and gallery 438. However, the user interface 402 also includes the additional UI elements 411, 412, and 420 and the menu 440 including menu elements 417 and 418 from the user interface 401. The user interface 402 also includes UI elements 413 and 414 and additional menu items 415, 416, and 419.

If displayed to a new user of the digital magazine system, a full featured UI such as the user interface 402 can overwhelm the user with too many options and can discourage the user from finding and utilizing the basic functions of the digital magazine system, or from becoming proficient in any additional functions of the digital magazine system. However, the user interface 402 can be associated with a user who has progressed from the basic user interface 400 to the full user interface 402 by incrementally unlocking functions of the digital magazine based on the increased skill level of the user with the functions of the digital magazine. For example, a brand new user of a digital magazine can be initially displayed a basic user interface such as the user interface 400. Then, based on user interactions with the digital magazine, UI elements can be added to the user's associated user-specific UI, resulting in the customized UI 401, and later further functions can be unlocked and additional UI elements added, leading to the user-specific UI resembling the UI 402.

Figure 5:
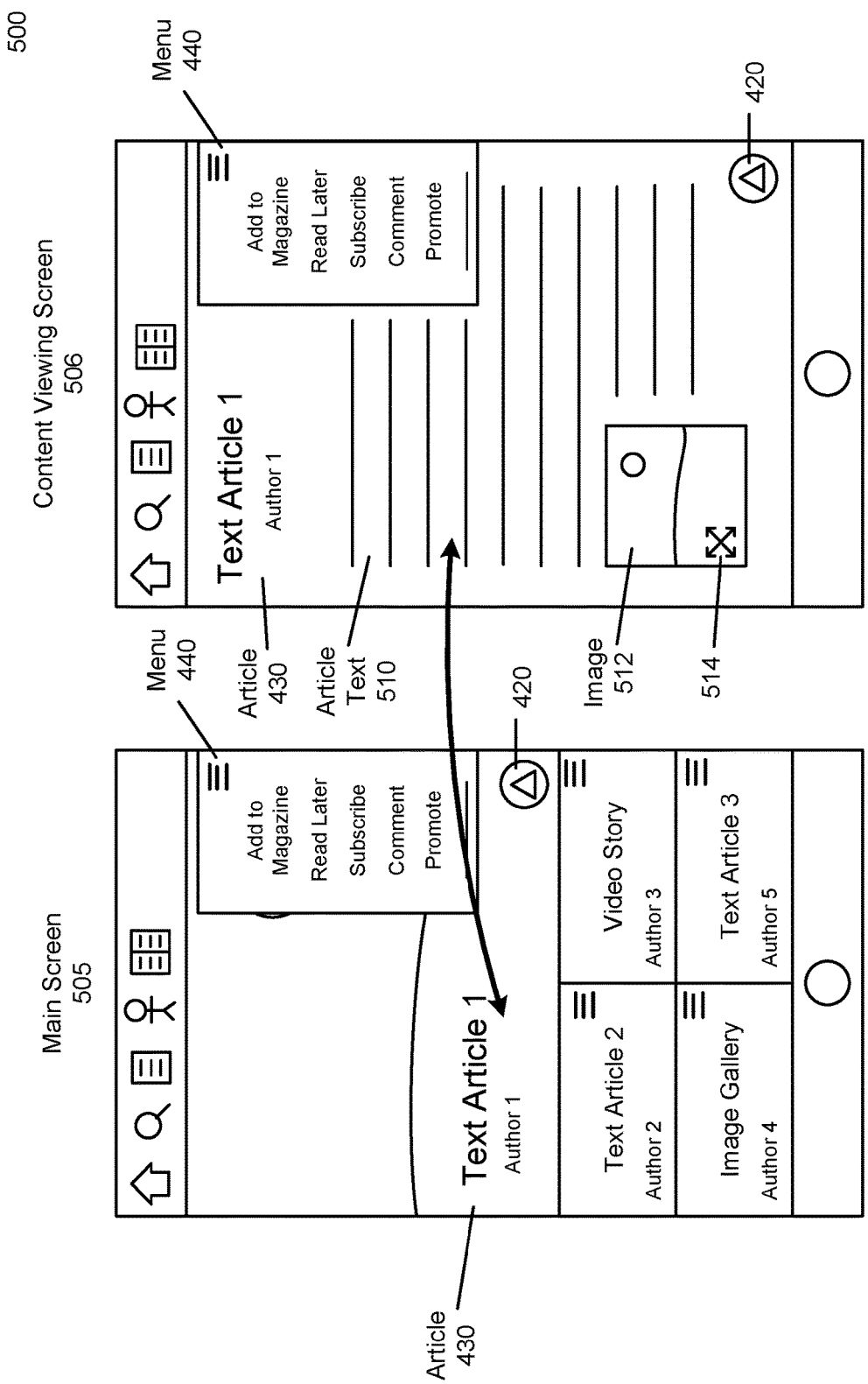
FIG. 5 illustrates an example user interface for displaying a page of a digital magazine on the user interface, according to one embodiment.

FIG. 5 illustrates an example article user interface of a digital magazine presented to a user of a client device 130, according to one embodiment. The user interface 500 includes a main screen 505 similar to the user interfaces 400-402. In this embodiment, the main screen includes UI elements corresponding to content items of the digital magazine such as the article 430 and UI elements corresponding to functions of the digital magazine, such as the menu 440 and the UI element 420. The user interface 500 also includes the content viewing screen 506 which can allow a user to view a content item presented through the user interface. The content viewing screen 506 includes the article 430, the article text 510, an image 512, UI elements 514 and 420, and the menu 440.

The content viewing screen 506 can allow the user to interact with content items selected on the main screen 505 of the user interface. For example, the content viewing screen displays article text 510 associated with the article 430 which can be selected from the main screen 505. Similar to the main screen 505, the content viewing screen 506 contains UI elements that can be customizable based on user experience with the digital magazine.

Example Function Chart

Figure 6A:
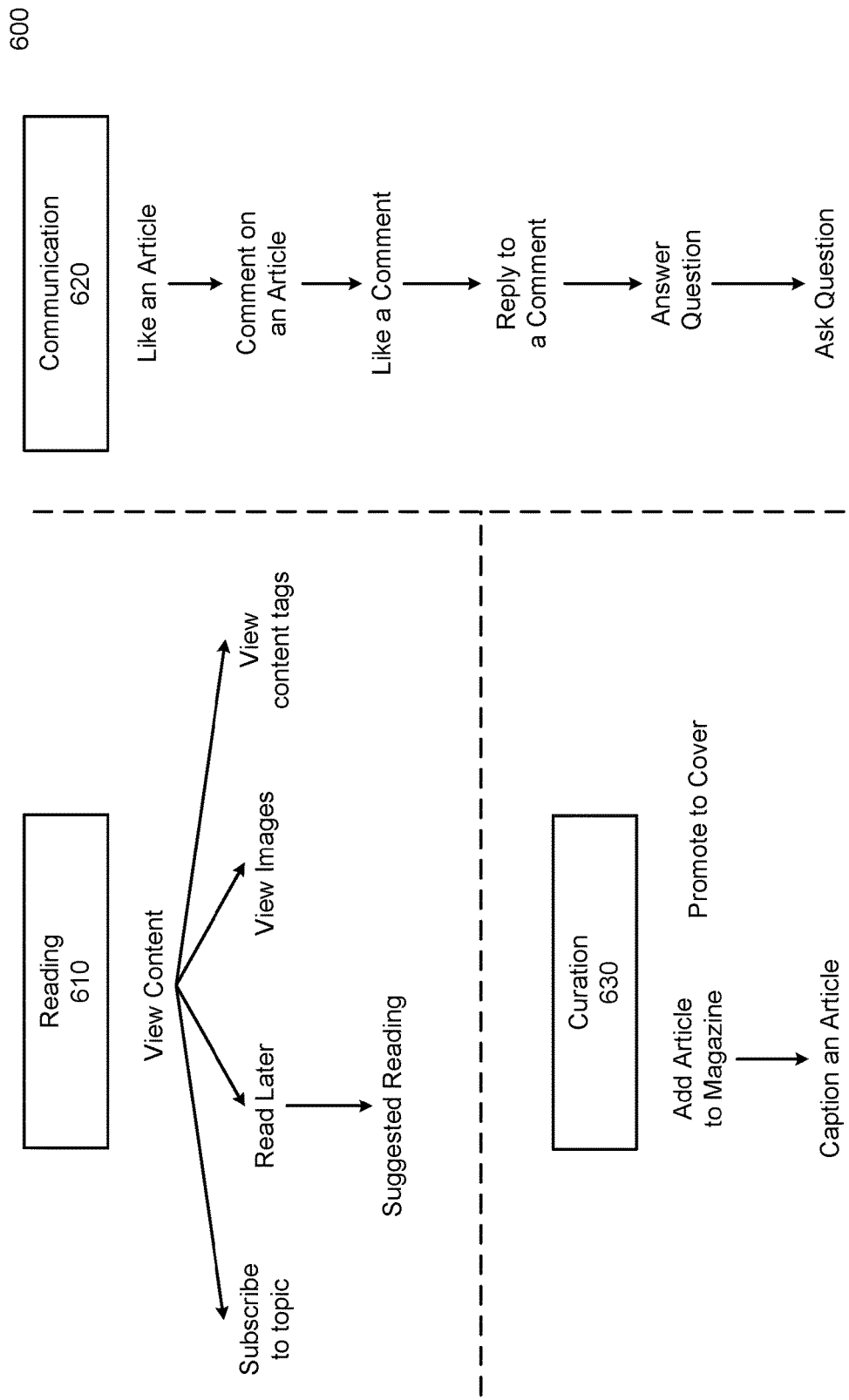
FIG. 6A illustrates an example user progression tree representing a user's skills with various categories of functions of a digital magazine, according to one embodiment.

FIG. 6A illustrates an example user progression tree representing a user's skills in various categories and their associated types of user interactions, according to one embodiment. The user progression tree 600 includes hierarchical tree structures for a reading category 610, a communication category 620, and a curation category 630. Each category of the progression tree 600 is tied to a separate set of user interactions with digital magazines, and can be associated with a corresponding user archetype. For example, the reading category 610 can be associated with a "reader" user archetype and contain functions of the digital magazine tied to finding and viewing content items of the digital magazine. Similarly, the communication and curation categories 620 and 630 can be associated with "communicator" and "curator" user archetypes and can respectively contain functions tied to curating content for a digital magazine or interacting with content items associated with other users of the digital magazine server 150. Each node associated with each category is associated with a digital magazine function also linked to that category.

As described above, each of the categories 610-630 can be associated with a hierarchical progression sub-tree representing a user's progress with functions associated with the category 610-630. For example, a user can progressively unlock the "view content," "read later," and "suggested reading" functionalities of the reading category 610. In some implementations, each of the categories 610-630 is associated with a category specific threshold. Similarly, each time a user utilizes an unlocked function associated with the category, a predetermined amount of points can be contributed towards the category specific threshold. Each time the category-specific threshold is met or exceeded, new functions associated with a node in the associated subtree can be unlocked.

For example, a user at the "view content" skill level of the reading category 610 reaches the category specific threshold associated with the reading category 610, e.g., based on the number of articles viewed by the user. At this point the user can access an additional function based on the user's progress. For example, the user can have the "subscribe to topic," "read later," "view images," or "view content tags" functions available to be unlocked. In some implementations, a function represented at a lower level of a user's progression tree can only be unlocked after one or more previous functions in the user progression tree are unlocked, indicating that the user has adequate skills with the functions represented by the one or more previous levels of nodes of the progression tree. For example, a user cannot access the "reply to a comment" function in the communication category 620 before the "like a comment" function has been used by the user.

Figure 6B:
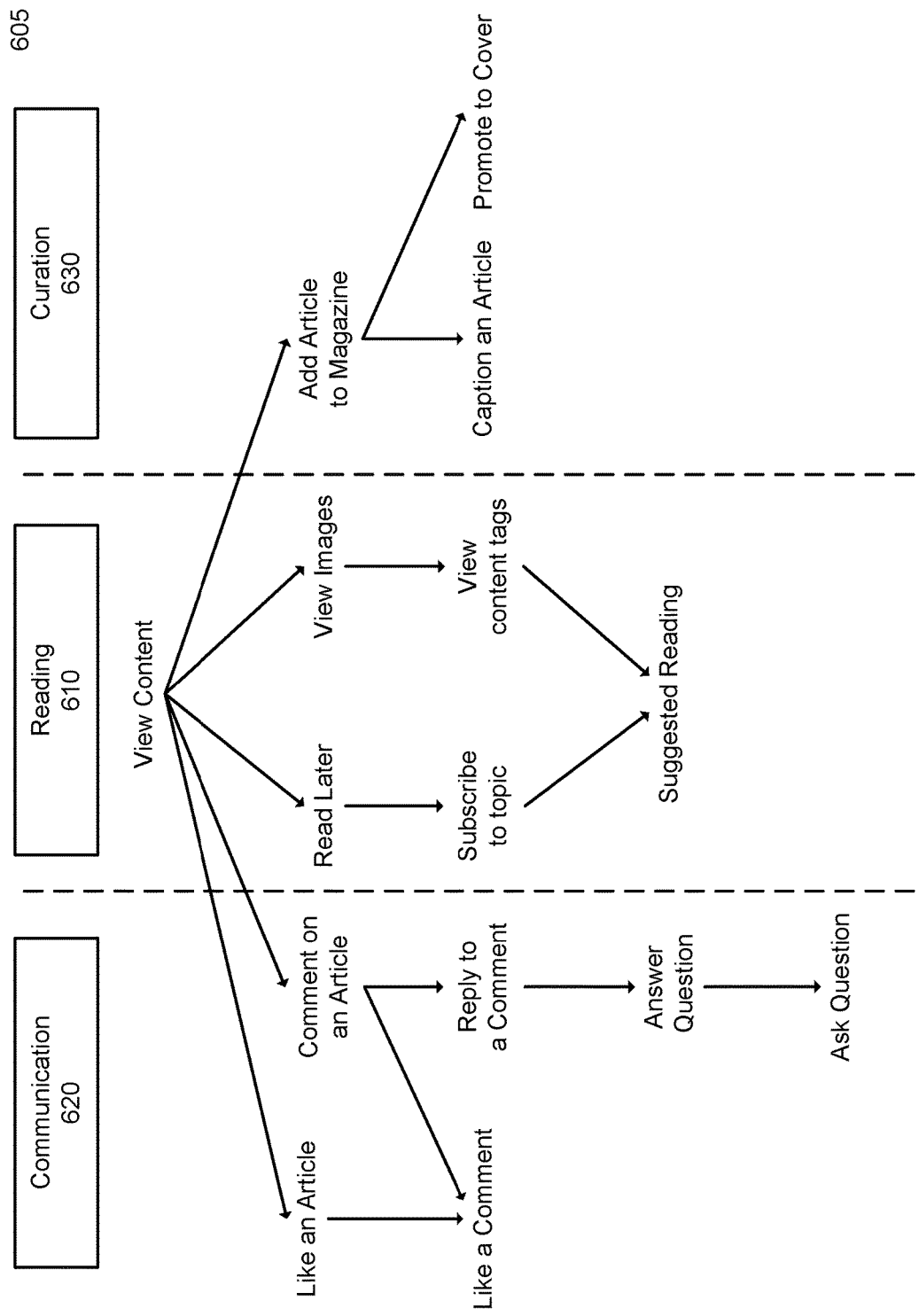
FIG. 6B illustrates a second example user progression tree, according to one embodiment.

FIG. 6B illustrates a second example user progression tree, according to one embodiment. Similar to the user progression tree 600, the user progression tree 605 includes a hierarchical tree structure for functions associated with a reading category 610, a communication category 620, and a curation category 630. However, in this embodiment, the hierarchical tree structure extends between categories. In this embodiment, a function in a first category may have to be unlocked before functions in another category can be unlocked.

In some implementations, function-specific thresholds can be utilized to unlock functions of a digital magazine in accordance with the progression tree 605. In some embodiments, each node of the user progression tree 605 is associated with a function specific threshold outlining a specific amount and type of interactions needed to unlock that function shown in the user progression tree. For example, the "caption an article" function can be associated with a function specific threshold of adding 5 content items to a digital magazine. Similarly, the "suggested reading" function can be unlocked based on subscribing to 6 topics and viewing the content tags of 10 content items in a digital magazine.

Example User Profile

Figure 7:
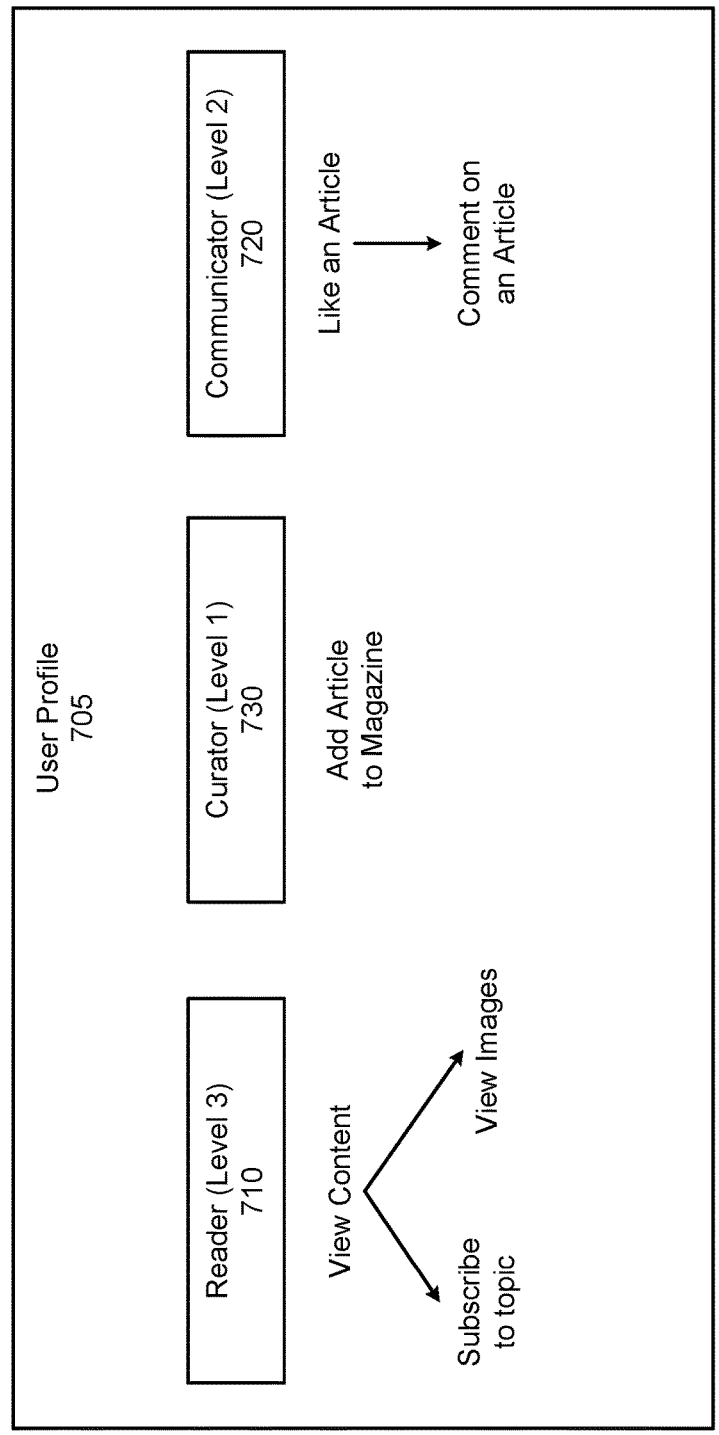
FIG. 7 illustrates an example user profile derived from the user's corresponding functionality skills with functions of a digital magazine, according to one embodiment.

FIG. 7 illustrates an example user profile derived from the user's corresponding progression with functions of a digital magazine, according to one embodiment. The user profile 705 includes user progression data associated with a reader 710, communicator 720, and curator 730 archetypes. In some embodiments, user archetype information is generated by the progression analysis module 220 and stored within the user profile 705. In this embodiment, the user profile 705 includes information about unlocked functions associated with each archetype. For example, the user profile 705 includes information that the user has unlocked "view content," "subscribe to topic," and "view images" functions of the digital magazine.

In some implementations, a user profile 705 also contains user-specific UI information. A user profile 705 can outline which UI elements are present in the user-specific UI and the positions of those UI elements within the user-specific UI. For example, the user profile 705 can include information about the user-specific user information 401 of FIG. 4B such as the UI elements 411, 412, 417, and 418.

Example Process of Customizing a User Interface

Figure 8:
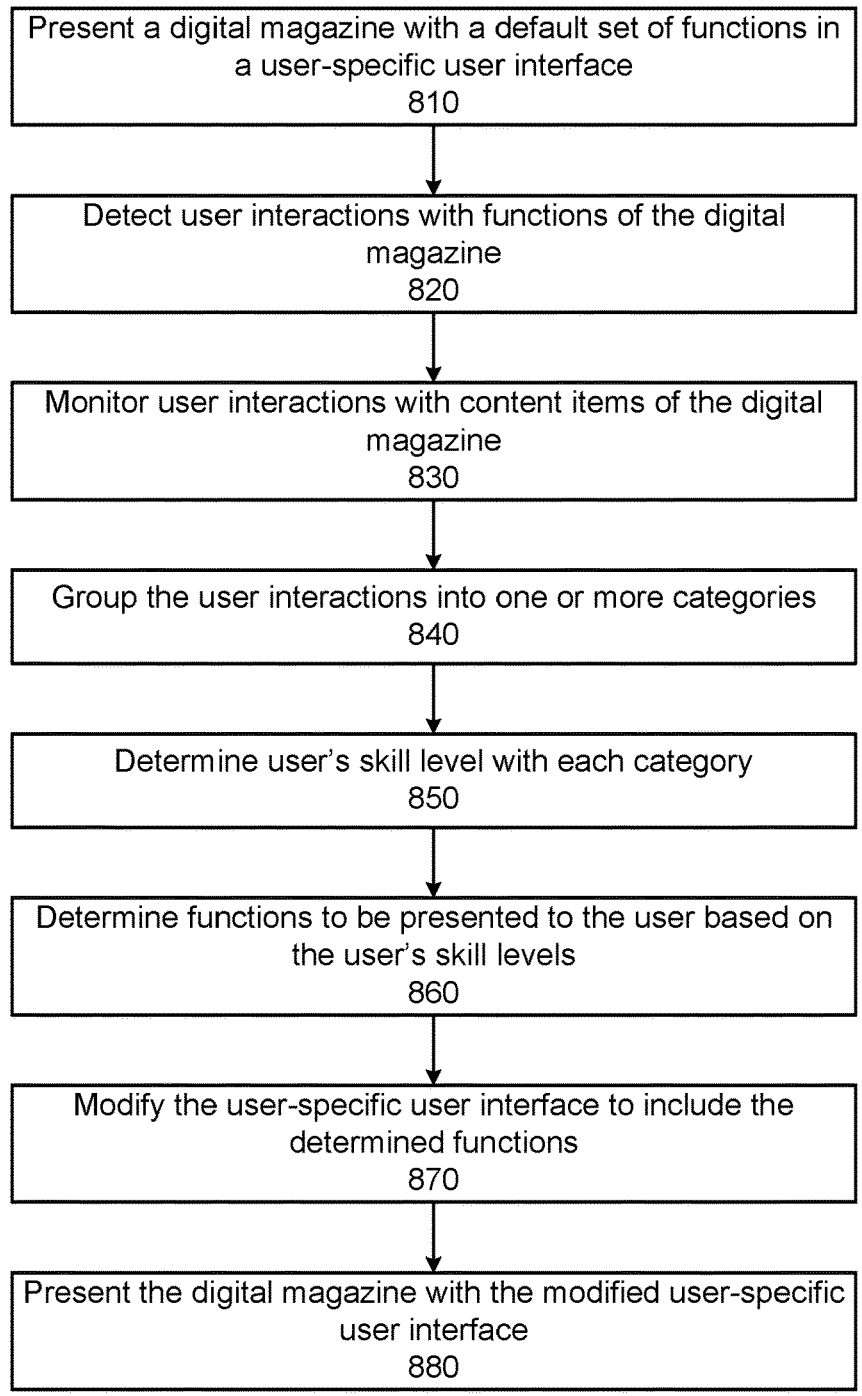
FIG. 8 is a flowchart of a process for modifying a user-specific user interface for presenting functions of a digital magazine based on user's functionality skills with the functions of the digital magazine, according to one embodiment.

FIG. 8 is a flowchart of a process for modifying a user profile of a user-specific user interface for presenting functions of a digital magazine based on user's functionality skills with the functions of the digital magazine, according to one embodiment. Process 800 begins with presenting 810 a digital magazine with a default set of functions of the digital magazine in a user-specific user interface, e.g., the UI 400 shown in FIG. 4A. The client device 130 detects 820 user interactions with the functions of the digital magazine and monitors 830 user interactions with content items of the digital magazine, where a user interaction with a content item is associated with a function of the digital magazine. The client device 130 groups 840 the user interactions into one or more categories. For example, the user reading a content item can be associated with a "reading" category. The client device 130 determines 850 the user's skill level with each category based on the user interactions specific for that category. Based on the amount of user interactions, the client device 130 determines 860 additional functions to be presented to the user. For example, the logged user interactions can be compared with a threshold amount of interactions associated with the category, and additional functions of the corresponding category of the digital magazine can be selected and unlocked for the user. The client device 130 modifies 870 the user-specific user interface to include the determined functions, and the user can specify the location of UI elements corresponding to the selected functions within the user-specific UI. The client device 130 presents 880 the digital magazine with the modified user-specific user interface. The client device 130 provides the monitored user interactions to the digital magazine server 150, which generates a user profile based on the user's skill levels with functions of the digital magazine.

Example Process of Recommending Content Based on a User Interface

Figure 9:
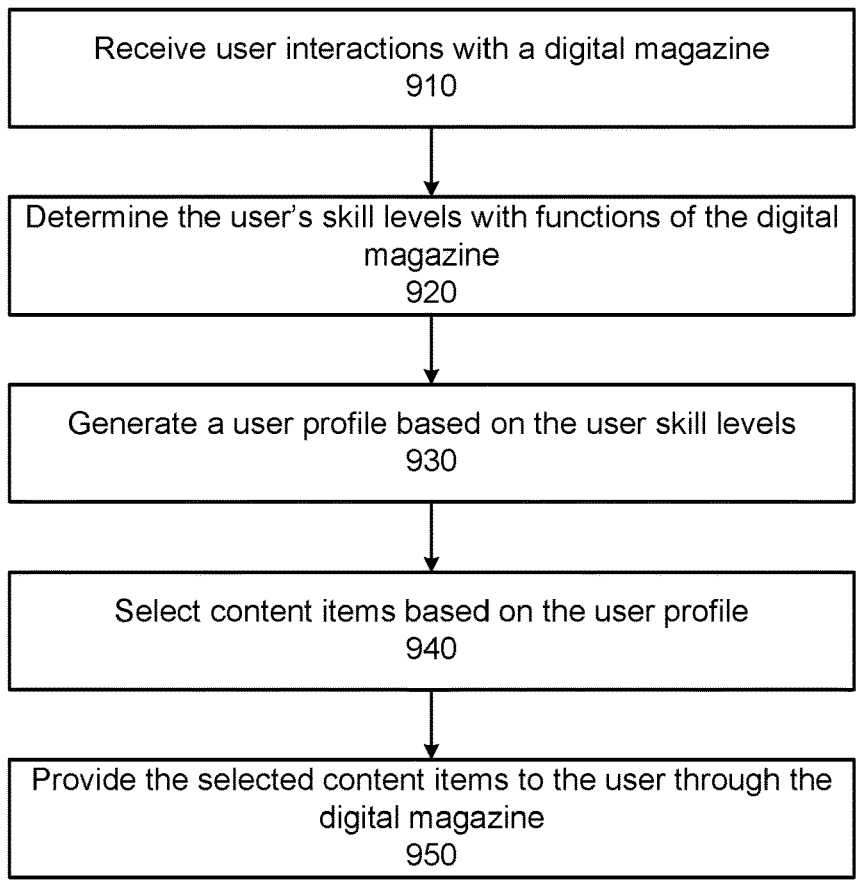
FIG. 9 is a flowchart of a process for recommending content to a user based on a user profile derived from the user's skill levels with functions of a digital magazine, according to one embodiment.

FIG. 9 is a flowchart of a process for recommending content to a user based on a user-profile derived from the user's skill levels with functions of digital magazine, according to one embodiment. The digital magazine server 150 receives 910 user interactions with content items of a digital magazine from the client device 130, and determines 920 the user's skill levels with functions of the digital magazine. The digital magazine server 150 generates 930 a user profile based on the user's skill levels and selects 940 content items based on the user profile, e.g., content items more suitable for a user categorized as a reader archetype, and provides 950 the selected content items to the user, e.g., through the digital magazine.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method, comprising:
presenting a digital magazine to a user via a user interface on a client device, the user interface comprising a first set of user interface (UI) elements for the user to interact with the digital magazine via a first set of functions;
monitoring user's interactions with one or more content items of the digital magazine, each interaction associated with one or more of a plurality of categories of functions of the digital magazine, each category describing a type of function of the digital magazine;

determining, for each category of the plurality of categories of functions, a skill level of the user for that category of functions based on the monitored user interactions associated with the category;

selecting a second set of additional functions of the digital magazine other than the first set of functions to be presented to the user based on the user's skill level for the category of function associated with each additional function of the second set of additional functions;

modifying the user interface to include a second set of additional UI elements for the user to perform the second set of additional functions of the digital magazine, wherein each function of the second set of additional functions is associated with one or more additional UI element of the second set of additional UI elements; and presenting the digital magazine to a user via the modified user interface on the client device.

2. The method of claim 1, wherein the first set of UI elements comprises a predetermined number of basic elements, and a user interaction with the digital magazine through a basic element represents a basic skill level with a function of the digital magazine.

3. The method of claim 1, wherein the plurality of categories of functions comprises a reader category, a communicator category, and a curator category.

4. The method of claim 3, wherein the reader category is associated with user interactions comprising at least one of:
subscribing to a topic of the digital magazine;
marking a content item of the digital magazine for suggested reading;
viewing a content item of the digital magazine; and
viewing a content tag of a content item of the digital magazine.

5. The method of claim 3, wherein the communicator category is associated with user interactions comprising at least one of:
showing a favorable opinion to a content item of the digital magazine;
commenting on a content item of the digital magazine;
showing a favorable opinion to a comment on a content item of the digital magazine;
answering a question presented by the digital magazine; and
posting a question on the user interface of the digital magazine.

6. The method of claim 3, wherein the curator category is associated with user interactions comprising at least one of:
adding a content item to the digital magazine;
adding a caption to a content item of the digital magazine; and
promoting a content item to a cover of the digital magazine.

7. The method of claim 1, wherein each category of functions of the digital magazine is presented in a hierarchical tree structure, and wherein each function at a next level of the hierarchical tree structure is associated with a skill level that is higher than the skill level associated with a previous level of the hierarchical tree structure.

8. A computer-implemented method, comprising:
receiving, from a client device, a plurality of user interactions with a digital magazine presented to a user of the client device, each user interaction associated with one or more of a plurality of categories of functions of the digital magazine, each category describing a type of function of the digital magazine;

determining, for each category of the plurality of categories of functions, a skill level of the user for that category of functions based on the plurality of user interactions associated with the category;

generating, based on the determined skill levels of the user in each of the plurality of categories of functions, a user profile indicating a type of the user;

selecting one or more content items of the digital magazine based on the user profile; and providing the selected content items for presenting to the user on the client device.

9. The method of claim 8, wherein the type of the user is one of a reader, a communicator, and a curator.

10. The method of claim 8, wherein selecting one or more content items of the digital magazine based on the user profile comprises selecting content items based on the type of user identified in the user profile.

11. A non-transitory computer readable storage medium, comprising instructions that, when executed by a processor, cause the processor to perform the steps of:
presenting a digital magazine to a user via a user interface on a client device, the user interface comprising a first set of user interface (UI) elements for the user to interact with the digital magazine via a first set of functions;

monitoring user's interactions with one or more content items of the digital magazine, each interaction associated with one or more of a plurality of categories of functions of the digital magazine, each category describing a type of function of the digital magazine;

determining, for each category of the plurality of categories of functions, a skill level of the user for that category of functions based on the monitored user interactions associated with the category;

selecting a second set of additional functions of the digital magazine other than the first set of functions to be presented to the user based on the user's skill level for the category of function associated with each additional function of the second set of additional functions;

modifying the user interface to include a second set of additional UI elements for the user to perform the second set of additional functions of the digital magazine, wherein each function of the second set of additional functions is associated with one or more additional UI element of the second set of additional UI elements; and presenting the digital magazine to a user via the modified user interface on the client device.

12. The non-transitory computer readable storage medium of claim 11, wherein the first set of UI elements comprises a predetermined number of basic elements, and a user interaction with the digital magazine through a basic element represents a basic skill level with a function of the digital magazine.

13. The non-transitory computer readable storage medium of claim 11, wherein the plurality of categories of functions comprises a reader category, a communicator category, and a curator category.

14. The non-transitory computer readable storage medium of claim 13, wherein the reader category is associated with user interactions comprising at least one of:
subscribing to a topic of the digital magazine;
marking a content item of the digital magazine for suggested reading;
viewing a content item of the digital magazine; and viewing content tag of a content item of the digital magazine.

15. The non-transitory computer readable storage medium of claim 13, wherein the communicator category is associated with user interactions comprising at least one of:
   showing a favorable opinion to a content item of the digital magazine;
   commenting on a content item of the digital magazine;
   showing a favorable opinion to a comment on a content item of the digital magazine;
   answering a question presented by the digital magazine; and
   posting a question on the user interface of the digital magazine.

16. The non-transitory computer readable storage medium of claim 13, wherein the curator category is associated with user interactions comprising at least one of:
   adding a content item to the digital magazine;
   adding a caption to a content item of the digital magazine; and
   promoting a content item to a cover of the digital magazine.

17. The non-transitory computer readable storage medium of claim 11, wherein each category of functions of the digital magazine is presented in a hierarchical tree structure, and wherein each function at a next level of the hierarchical tree structure is associated with a skill level that is higher than the skill level associated with a previous level of the hierarchical tree structure.

18. A non-transitory computer readable storage medium, comprising instructions that, when executed by a processor, cause the processor to perform the steps of:
   receiving, from a client device, a plurality of user interactions with a digital magazine presented to a user of the client device, each user interaction associated with one or more of a plurality of categories of functions of the digital magazine, each category describing a type of function of the digital magazine;
   determining, for each category of the plurality of categories of functions, a skill level of the user for that category of functions based on the plurality of user interactions associated with the category;
   generating, based on the determined skill levels of the user in each of the plurality of categories of functions, a user profile indicating a type of the user;
   selecting one or more content items of the digital magazine based on the user profile; and
   providing the selected content items for presenting to the user on the client device.

19. The non-transitory computer readable storage medium of claim 18, wherein the type of the user is one of a reader, a communicator, and a curator.

20. The non-transitory computer readable storage medium of claim 18, wherein selecting one or more content items of the digital magazine based on the user profile comprises selecting content items based on the type of user identified in the user profile.

* * * * *

UNITED STATES PATENT AND TRADEMARK OFFICE
CERTIFICATE OF CORRECTION

PATENT NO. : 10,268,335 B2
APPLICATION NO. : 15/280773
DATED : April 23, 2019
INVENTOR(S) : Douglas Tchun Jia Lee It is certified that error appears in the above-identified patent and that said Letters Patent is hereby corrected as shown below:

In the Claims

Column 15 Claim 1, Lines 17-18; Column 16 Claim 11, Lines 46-47: Written as "one or more additional UI element of the second set" should be written as "one or more additional UI elements of the second set"

Column 15 Claim 3, Lines 27-28; Column 16 Claim 13, Lines 58-59: Written as "the plurality of categories of functions comprises a" should be written as "the plurality of categories of functions comprise a"

Signed and Sealed this
Twentieth Day of April, 2021

Drew Hirshfeld
*Performing the Functions and Duties of the
Under Secretary of Commerce for Intellectual Property and
Director of the United States Patent and Trademark Office*